Feb. 25, 1958 G. KLEMT 2,824,494
OPTICAL OBJECTIVE SYSTEM WITH INTERCHANGEABLE ELEMENTS
FOR FOCAL-LENGTH VARIATIONS
Filed July 3, 1956
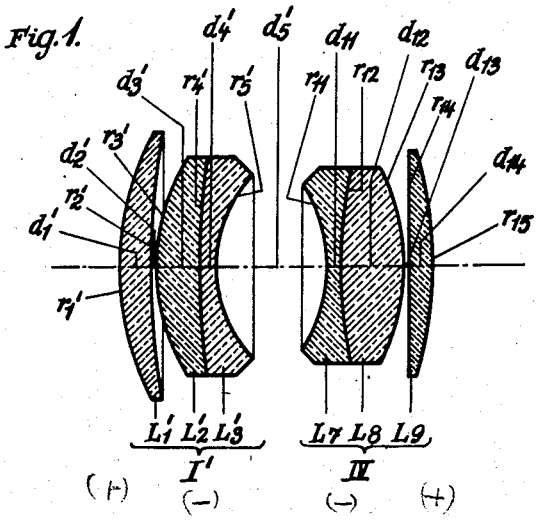
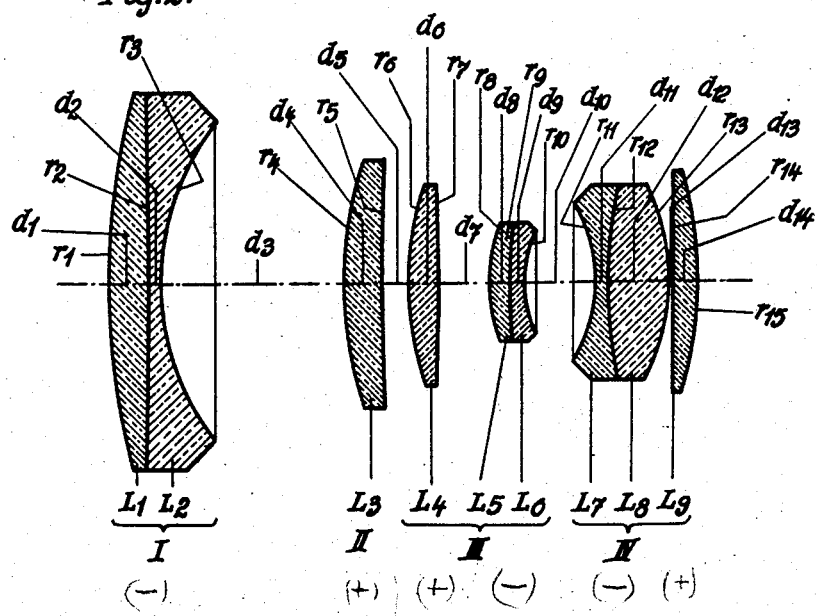
INVENTOR:
Günter KLEMT
BY
Karl F. Ross
AGENT

United States Patent Office 2,824,494
Patented Feb. 25, 1958

2,824,494

OPTICAL OBJECTIVE SYSTEM WITH INTERCHANGEABLE ELEMENTS FOR FOCAL-LENGTH VARIATIONS

Günter Klemt, Kreuznach, Germany, assignor to Jos. Schneider & Co., Kreuznach, Rhineland, Germany Application July 3, 1956, Serial No. 595,629

Claims priority, application Germany July 13, 1955

2 Claims. (Cl. 88—57)

In my co-pending application Ser. No. 438,174, filed June 21, 1954, now Patent No. 2,796,002, issued June 18, 1957, I have disclosed a photographic objective system the focal length and thus the image scale of which can be changed without substantial variations of its effective image distance by interchanging a detachable objective portion on the object side cooperating with a fixed objective portion on the image side. As taught more particularly in that application, the basic objective whose focal length is to be modified is a Gaussian-type dual objective comprising a pair of collective outer lenses between which there are enclosed a pair of dispersive menisci facing the diaphragm space and composed each of a positive and a negative lens cemented together; a three-unit lens assembly is designed to replace the front half of this Gaussian objective for the purpose of reducing the focal length of the system.

Although this type of system can be theoretically designed for aperture ratios of about 1:4.5, it has been found that the existence of residual coma results in a reduction of contrasts which militates against a relative aperture greater than about 1:5.6. My present invention has for its object the provision of an improved system of the general character referred to in which these drawbacks are eliminated and larger relative apertures can be conveniently obtained without objectionable loss of contrast.

The three units of an exchange assembly as described in my prior application, and also according to my present invention, are a front member comprising a negative meniscus with rearwardly facing concavity, an intermediate positive lens member, and a rear unit which is similar to the front half of the basic Gaussian objective in that it consists of two air-spaced members, including a positive forward member and a meniscus-shaped negative back member adjacent the diaphragm space. The front and intermediate members together define an afocal system in the shape of an inverse Galilean telescope.

In accordance with a feature of my present invention, the spacing between the negative front member and the positive intermediate member of the exchange assembly is not only large compared to the other air spaces of this assembly, as already pointed out in my above-identified application, but exceeds 45% of the overall focal length of the complete system. According to another feature of the invention, this front member is cemented from a positive front lens and a negative meniscus-shaped rear lens which latter consists of a highly refractive material whose index of refraction for the yellow helium line of the spectrum is greater than 1.70 and exceeds the refractive index of the positive lens cemented thereto by a value ranging between 0.04 and 0.06.

According to a further feature of this invention, the radius of the concave rear surface of the meniscus-shaped front member exceeds 60% of the overall focal length of the system while the corresponding radius of the similarly shaped back member is greater than 30% of that overall focal length. This back member is, preferably, likewise of the compound type, consisting of two cemented lenses having a difference greater than 0.08 in their refractive indices for the yellow helium line, the higher refractive index being that of the rear cemented lens.

The invention will be further described with reference to the accompanying drawing in which:

Fig. 1 schematically illustrates the front and rear halves of a fundamental optical system, of predetermined focal length, in the form of a Gaussian dual objective; and Fig. 2 illustrates an exchange objective, of reduced focal length, obtained by substituting a lens assembly according to the invention for the front half of the objective of Fig. 1.

In the drawing, wherein so far as practicable I have used the same reference characters as in my above-identified co-pending application, I have shown in Fig. 1 a Gaussian objective comprising a front half I' detachably secured to a rear half IV by means not shown, e. g. in the manner disclosed in my co-pending application Ser. No. 402,679, filed January 7, 1954, or in pending application Ser. No. 431,506, filed May 21, 1954, by Paul Härter et al., both owned by the assignee of the present application. Front half I' consists of a positive, slightly meniscus-shaped lens member $L_1'$, whose radii are $r_1'$, $r_2'$ and whose thickness is $d_1'$, followed by a compound negative meniscus member composed of lenses $L_2'$ (radii $r_3'$, $r_4'$ and thickness $d_3'$) and $L_3'$ (radii $r_4'$, $r_5'$ and thickness $d_4'$), the spacing between the two members being designated $d_2'$. Rear half IV consists of a compound negative meniscus member composed of lenses $L_7$ (radii $r_{11}$, $r_{12}$ and thickness $d_{11}$) and $L_8$ (radii $r_{12}$, $r_{13}$ and thickness $d_{12}$) followed by a positive lens member $L_9$ (radii $r_{13}$, $r_{14}$ and thickness $d_{14}$), the spacing between the two last-mentioned members being designated $d_{13}$. The relatively large distance $d_5'$ between objective portions I' and IV defines a diaphragm space adapted to receive the usual iris diaphragm and shutter (not shown).

With an aperture ratio of 1:2, an overall focal length given the numerical value of 100 and an image distance (the spacing between the last lens $L_9$ and the surface of projection) equal to 72.4, the radii, thicknesses and spacings of the elements of the system of Fig. 1 as well as the indices of refraction $n_d$ and the Abbé numbers $v$ thereof may be as follows:

*Table A*

| | | | | $n_d$ | $v$ |
|---|---|---|---|---|---|
| I'— | $L_1'$ | $r_1'=+\ 54.83$ | $d_1'=\ 6.71$ | 1.67003 | 47.2 |
| | | $r_2'=+156.25$ | $d_2'=\ 1.27$ | (Air space) | |
| | $L_2'$ | $r_3'=+\ 39.67$ | $d_3'=\ 8.93$ | 1.69347 | 53.5 |
| | $L_3'$ | $r_4'=+168.32$ | $d_4'=\ 3.52$ | 1.66446 | 35.9 |
| | | $r_5'=+\ 25.89$ | $d_5'=21.21$ | (Diaphragm space) | |
| IV— | $L_7$ | $r_{11}=-\ 30.20$ | $d_{11}=\ 3.17$ | 1.63980 | 34.6 |
| | $L_8$ | $r_{12}=+\ 90.18$ | $d_{12}=11.88$ | 1.65844 | 50.8 |
| | | $r_{13}=-\ 41.87$ | $d_{13}=\ 0.21$ | (Air space) | |
| | $L_9$ | $r_{14}=+2359.37$ | $d_{14}=\ 5.25$ | 1.74472 | 44.7 |
| | | $r_{15}=-\ 77.24$ | | | |

In the exchange objective of Fig. 2 the lens group I' of Fig. 1 has been replaced by an assembly including three units I, II and III. Forward unit I is a negative meniscus composed of cemented lenses $L_1$ (radii $r_1$, $r_2$ and thickness $d_1$) and $L_2$ (radii $r_2$, $r_3$ and thickness $d_2$); intermediate unit II is a slightly meniscus-shaped positive member $L_3$ (radii $r_4$, $r_5$ and thickness $d_4$), its spacing from front member I being designated $d_3$; and rear unit III comprises two air-spaced members, including a positive lens $L_4$ (radii $r_6$, $r_7$ and thickness $d_6$) and a compound negative member whose forward positive component $L_5$ (radii $r_8$, $r_9$ and thickness $d_8$) is cemented onto a meniscus-shaped back component $L_6$ (radii $r_9$, $r_{10}$ and thickness $d_9$), the air space between these members being designated $d_7$ and the spacing of lens $L_4$ from lens $L_3$ of unit II being designated $d_5$. The length of the diaphragm space between lens $L_6$ of unit III and lens $L_7$ of the fixed group IV is designated $d_{10}$.

The lenses $L_4$ and $L_5$, $L_6$ of unit III are generally similar to the lenses $L_1$ and $L_2$, $L_3$ constituting the group I' in Fig. 1. Units I and II of Fig. 2 together constitute an inverse Galilean telescope whose air space $d_3$ is greater than 45% but less than 55% of the overall focal length of the exchange objective, as will appear from the following Table B wherein illustrative values for the parameters listed in Table A are given for the elements of the lens assembly I, II, III of Fig. 2 to provide a system with an aperture ratio of 1:4.5, an overall focal length of 74.3 and an image distance of 72.3:

Table B

| | | | | $n_d$ | $v$ |
|---|---|---|---|---|---|
| I | | $L_1$ | $r_1=+\ 144.58$ | | |
| | | | $d_1=\ 7.51$ | 1.67270 | 32.2 |
| | | $L_2$ | $r_2=+1067.84$ | | |
| | | | $d_2=\ 2.32$ | 1.72000 | 50.3 |
| | | | $r_3=+\ 50.27$ | | |
| | | | $d_3=36.99$ | (Air space) | |
| II | | $L_3$ | $r_4=+\ 75.74$ | | |
| | | | $d_4=\ 7.13$ | 1.67003 | 47.2 |
| | | | $r_5=+\ 365.51$ | | |
| | | | $d_5=\ 5.28$ | (Air space) | |
| III | | $L_4$ | $r_6=+\ 59.83$ | | |
| | | | $d_6=\ 6.56$ | 1.60311 | 60.7 |
| | | | $r_7=-1786.41$ | | |
| | | | $d_7=\ 9.83$ | (Air space) | |
| | | $L_5$ | $r_8=+\ 32.08$ | | |
| | | | $d_8=\ 4.22$ | 1.51478 | 60.6 |
| | | $L_6$ | $r_9=+\ 249.27$ | | |
| | | | $d_9=\ 2.95$ | 1.62536 | 35.6 |
| | | | $r_{10}=+\ 24.06$ | | |
| | | | $d_{10}=13.72$ | (Diaphragm space) | |

The total physical length of the assembly I, II, III, given as the sum of all spaces and thicknesses $d_1$ through $d_{10}$, is 96.51; this being approximately 50% larger than the corresponding length in the numerical examples given in my earlier application Ser. No. 438,174. It will be noted that the axial length of air space $d_3$ can also be expressed as exceeding 35% of this total physical length.

It will be noted from the foregoing table that the meniscus-shaped lens $L_2$ of the front member of unit I has a refractive index greater than 1.70 and that this index exceeds by about 0.05 the refractive index of associated lens $L_1$ cemented onto lens $L_2$. The dispersive rear surfaces of lenses $L_2$ and $L_6$ have been substantially flattened, in comparison with the system disclosed in my earlier application Ser. No. 438,174, by a relatively large dimensioning of their respective radii $r_3$, $r_{10}$ whose values exceed 60% and 30% but are less than 75% and 40%, respectively, of the overall focal length of numerical value 74.3; they can also be described as not less than approximately 50% and 25%, respectively, of the total physical length of the assembly I, II, III given as 96.51. The difference between the refractive indices of components $L_5$ and $L_6$ of the back member of rear unit III is approximately 0.11, thus being greater than 0.08 as specified above, component $L_5$ being, moreover, less highly refractive than component $L_6$. All the aforestated criteria for the suppression of residual coma, necessary for an attainment of a large relative aperture, have thus been satisfied.

I claim:

1. In an optical objective system, in combination, a front assembly and a rear assembly detachable from each other and defining between them a diaphragm space, said rear assembly being composed of a dispersive meniscus adjacent said diaphragm space and facing same with its concave side and of a positive lens back of said meniscus, said front assembly comprising a front unit, an intermediate unit and a rear unit; said rear unit consisting of a negative meniscus facing said diaphragm space with its concave side and a biconvex lens preceding said negative meniscus; said intermediate unit being a single positive lens member; said front unit consisting of a meniscus-shaped negative member facing said diaphragm space with its concave side; said front and intermediate units together defining an afocal system in the shape of an inverse Galilean telescope and being separated from each other by an air space whose axial length is between substantially 45% and 55% of the overall focal length of the combination of said front and rear assemblies, the radius of the rear surface of the negative meniscus of said rear unit being between substantially 30% and 40% of said overall focal length, the radius of the rear surface of the meniscus-shaped negative member of said front unit being between substantially 60% and 75% of said overall focal length, the meniscus-shaped negative member of said front unit consisting of a positive front lens and a negative rear lens cemented together, said rear lens having an index of refraction for the yellow helium line substantially not less than 1.70, said index of refraction exceeding that of said front lens by a value ranging substantially between 0.04 and 0.06, the negative meniscus of said rear unit consisting of a positive front component and a negative rear component cemented together, said rear component having an index of refraction exceeding that of said front component by substantially not less than 0.08, said dispersive meniscus of said rear assembly being composed of a less highly refractive front lens and a more highly refractive rear lens cemented together.

2. The combination according to claim 1, wherein the radii $r_1$, $r_2$ and the thickness $d_1$ of the front lens $L_1$ of said front unit, the radii $r_2$, $r_3$ and the thickness $d_2$ of the rear lens $L_2$ of said front unit, the spacing $d_3$ of said front unit from the positive lens member $L_3$ of said intermediate unit, the radii $r_4$, $r_5$ and the thickness $d_4$ of said member $L_3$, the spacing $d_5$ of said member $L_3$ from the biconvex lens $L_4$ of said rear unit, the radii $r_6$, $r_7$ and the thickness $d_6$ of said lens $L_4$, the spacing $d_7$ of said lens $L_4$ from the negative meniscus of said rear unit, the radii $r_8$, $r_9$ and the thickness $d_8$ of the positive front component $L_5$ of said negative meniscus, the radii $r_9$, $r_{10}$ and the thickness $d_9$ of the negative rear component of said negative meniscus, the axial length of the diaphragm space $d_{10}$, the radii $r_{11}$, $r_{12}$ and the thickness $d_{11}$ of the front lens $L_7$ of the dispersive meniscus of said rear assembly, the radii $r_{12}$, $r_{13}$ and the thickness $d_{12}$ of the rear lens $L_8$ of the last-mentioned meniscus, the air space $d_{13}$ between said last-mentioned meniscus and the positive lens $L_9$ of said rear assembly, the radii $r_{14}$, $r_{15}$ and the thickness $d_{14}$ of said lens $L_9$, and the refractive indices $n_d$ as well as the Abbé numbers $v$ of all the elements $L_1$ . . . $L_9$ of said front and rear assemblies have numerical values substantially as given in the following table, said front and rear assemblies together defining an exchange objective having an overall focal length of substantially 74.3 and an image distance of substantially 72.3, all based upon a numerical value of 100 for the overall focal length of a Gaussian dual objective consisting of said rear assembly and of a lens assembly roughly mirror-symmetrical thereto in the position of said front assembly:

|  |  |  | $n_d$ | $v$ |
|---|---|---|---|---|
| $L_1$ | $r_1=+\ 144.58$ | $d_1=\ 7.51$ | 1.67270 | 32.2 |
|  | $r_2=+1067.84$ | $d_2=\ 2.32$ | 1.72000 | 50.3 |
| $L_2$ | $r_3=+\ 50.27$ | $d_3=36.99$ | (Air space) |  |
|  | $r_4=+\ 75.74$ | $d_4=\ 7.13$ | 1.67003 | 47.2 |
| $L_3$ | $r_5=+\ 365.51$ | $d_5=\ 5.28$ | (Air space) |  |
|  | $r_6=+\ 59.83$ | $d_6=\ 6.56$ | 1.60311 | 60.7 |
| $L_4$ | $r_7=-1786.41$ | $d_7=\ 9.83$ | (Air space) |  |
|  | $r_8=+\ 32.08$ | $d_8=\ 4.22$ | 1.51478 | 60.6 |
| $L_5$ | $r_9=+\ 249.27$ | $d_9=\ 2.95$ | 1.62536 | 35.6 |
| $L_6$ | $r_{10}=+\ 24.06$ | $d_{10}=13.72$ | (Diaphragm space) |  |
|  | $r_{11}=-\ 30.20$ |  |  |  |
| $L_7$ | $r_{12}=+\ 90.18$ | $d_{11}=\ 3.17$ | 1.63980 | 34.6 |
| $L_8$ | $r_{13}=-\ 41.87$ | $d_{12}=11.88$ | 1.65844 | 50.8 |
|  | $r_{14}=+2359.37$ | $d_{13}=\ 0.21$ | (Air space) |  |
| $L_9$ | $r_{15}=-\ 77.24$ | $d_{14}=\ 5.25$ | 1.74472 | 44.7 |

References Cited in the file of this patent

UNITED STATES PATENTS

| 2,662,447 | Tronnier | Dec. 15, 1953 |
| 2,780,139 | Lange | Feb. 5, 1957 |

FOREIGN PATENTS

| 472,234 | Germany | Mar. 5, 1929 |
| 1,102,390 | France | May 4, 1955 |
| 1,106,793 | France | July 27, 1955 |